United States Patent
Dorrendorf et al.

(10) Patent No.: US 10,554,435 B2
(45) Date of Patent: Feb. 4, 2020

(54) SYSTEMS AND METHODS FOR IMPLEMENTING DIGITAL CONTENT EFFECTS

(71) Applicant: ARM LIMITED, Cambridge (GB)

(72) Inventors: Leonid Dorrendorf, Givatayim (IL); John Eugene Neystadt, Kfar-Saba (IL)

(73) Assignee: ARM Limited, Cambridge (GB)

(*) Notice: Subject to any disclaimer, the term of this patent is extended or adjusted under 35 U.S.C. 154(b) by 102 days.

(21) Appl. No.: 15/676,058

(22) Filed: Aug. 14, 2017

(65) Prior Publication Data

US 2019/0052475 A1 Feb. 14, 2019

(51) Int. Cl.
*H04L 12/28* (2006.01)
*H04L 12/24* (2006.01)
*H04L 12/66* (2006.01)
*G06F 15/173* (2006.01)

(52) U.S. Cl.
CPC .......... *H04L 12/282* (2013.01); *G06F 15/173* (2013.01); *H04L 12/66* (2013.01); *H04L 41/0813* (2013.01); *H04L 2012/2841* (2013.01)

(58) Field of Classification Search
CPC ............................. H04L 12/282; G06F 15/173
See application file for complete search history.

(56) References Cited

U.S. PATENT DOCUMENTS

| | | | |
|---|---|---|---|
| 2012/0105447 A1* | 5/2012 | Kim | H04N 21/42226 345/419 |
| 2013/0307786 A1* | 11/2013 | Heubel | G06F 3/016 345/173 |
| 2014/0267906 A1* | 9/2014 | Mickelsen | H04N 21/4131 348/515 |
| 2017/0006334 A1* | 1/2017 | Beckett | H04N 21/43615 |
| 2017/0208057 A1* | 7/2017 | Wang | H04L 63/083 |
| 2017/0257664 A1* | 9/2017 | Tam | H04N 21/435 |
| 2018/0190024 A1* | 7/2018 | Dugan | G06T 19/006 |
| 2018/0295405 A1* | 10/2018 | Barnett, Jr. | H04N 21/4122 |

* cited by examiner

*Primary Examiner* — Thomas C Lee
*Assistant Examiner* — Charles Cai
(74) *Attorney, Agent, or Firm* — Nixon & Vanderhye P.C.

(57) ABSTRACT

Embodiments provide methods, apparatus, and systems for augmenting user experiences of digital content consumed on a user device. Physical effects specified in an effects file/track that is associated with digital content are implemented via one or more Internet of Things (IoT) devices located in the environment in which the digital content is being consumed.

15 Claims, 7 Drawing Sheets

Actuator Registration

Effects Authorisation

Effects Implementation - example

Effects Implementation - example

SYSTEMS AND METHODS FOR IMPLEMENTING DIGITAL CONTENT EFFECTS

FIELD OF THE INVENTION

The present techniques generally relate to methods, apparatuses and systems for augmenting user experiences of digital content, and in particular to implementing effects associated with digital content via one or more IoT devices.

BACKGROUND

Since the advent of the Internet, there has been a rapid increase in the interconnectedness of devices capable of storing and processing data. Now, with the development of what is known as the Internet of things (IoT), devices that were not conventionally equipped to store and process data are becoming so equipped. Examples are the so-called "intelligent home", in which lighting, heating, cooling and alarm systems can be remotely monitored and controlled over networks of wired and wireless systems. The intelligent home concept has been extended into workplaces/offices, and places used for temporary accommodation, such as hotels. Vehicles are now also increasingly sophisticated in their on-board electronics, including many features such as remote GPS tracking, navigation systems and the means to store and recall driver preferences in such matters as seat positioning, entertainment and many other features.

In a "smart environment", it is currently possible to, for example, synchronise IoT lighting with music emitted from speakers (via a microphone that detects the beat of the music and an app that can synchronise the pulsing of the lighting with the beat), or to synchronise IoT lighting with the colour of a movie playing on a television (via a camera that detects the hue/colour of the movie and an app that can synchronise the colour/hue of the lighting with the television). However, the focus has thus far been on IoT lighting. Moreover, the synchronisation of IoT devices with, for example, a movie, usually occurs in an ad-hoc manner, and may occur in different ways based on which app, software or device is being used to interpret the movie and determine what effect to implement. More advanced effects may be implemented in 4D cinemas, using vibrating or moving chairs, air jets, water sprays, smoke/fog machines, etc. However, 4D cinemas usually require specific pieces of equipment to be installed to implement each type of effect, which can be expensive. The specific pieces of equipment may be proprietary pieces of equipment that form a single system that is designed to play a movie, generate effects and implement those effects. This may require a user to invest in pieces of equipment that are designed to work together, but may not cooperate with a user's existing equipment (e.g. existing speakers, lighting, etc.)

The present invention broadly provides technologies to enhance user experiences of digital content in smart environments.

SUMMARY

According to a first aspect of the present techniques, there is provided a machine-implemented method for augmenting user experiences of digital content consumed on a user device, the method comprising: receiving, at a management module, a message comprising an effect associated with an item of digital content; generating, based on the received message, a control signal comprising instructions to implement the effect; and transmitting, to at least one actuator device, the generated control signal comprising instructions to implement the effect.

According to a second aspect of the present techniques, there is provided a management module comprising: a memory; a processor coupled to the memory, the processor configured to: receive a message comprising an effect associated with an item of digital content; generate, based on the received message, a control signal comprising instructions to implement the effect; and transmit, to at least one actuator device, the generated control signal comprising instructions to implement the effect.

According to a third aspect of the present techniques, there is provided an actuator device for augmenting user experiences of digital content consumed on a user device, the actuator device comprising: a memory; a processor coupled to the memory, to: receive a control signal comprising instructions to implement an effect associated with an item of digital content; determine how to implement the effect using one or more capabilities of the actuator device; and implement the effect.

According to a fourth aspect of the present techniques, there is provided a machine-implemented method for augmenting user experiences of digital content consumed on a user device, the method comprising: receiving, at an actuator device, a control signal comprising instructions to implement an effect associated with an item of digital content; determining how to implement the effect using one or more capabilities of the actuator device; and implementing the effect.

According to a fifth aspect of the present techniques, there is provided a system for augmenting user experiences of digital content consumed on a user device, the system comprising: a user device for consuming an item of digital content, the digital content comprising an effects file; at least one actuator device; a management module to: receive a message comprising an effect associated with an item of digital content; generate, based on the received message, a control signal comprising instructions to implement the effect; and transmit, to the at least one actuator device, the generated control signal; wherein the at least one actuator device: receives the control signal comprising instructions to implement the effect; determines how to implement the effect using one or more capabilities of the actuator device; and implements the effect.

According to a sixth aspect of the present techniques, there is provided an authorisation module comprising: a memory; and a processor coupled to the memory, to: receive (from a user device) user authorisation of zero or more capabilities of the at least one actuator device; create an authorisation token comprising the user authorisation; and transmit the authorisation token to the management module.

According to a seventh aspect of the present techniques, there is provided a non-transitory data carrier carrying code which, when implemented on a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

The following features apply to any of the above aspects.

As explained in more detail below, the effect in the message received by the management module may be extracted or derived from an effects file that is a part of, or is associated with, an item of digital content (that is being consumed, or is to be initiated, on a user device). The effects file may be considered part of an item of digital content, in a similar way to how an audio file, video file or subtitles file is considered part of a movie. The effects file may comprise information as to when each effect is to occur (in relation to a point/time within the item of digital content), and may comprise one or more effect parameters for each effect that specify how that effect is to be implemented.

The message comprising an effect associated with an item of digital content may further comprise a time indicating when the effect is to be implemented.

The message may further comprise a duration indicating for how long the effect is to be implemented.

The message may further comprise an end time indicating when the effect is to be terminated. Additionally or alternatively, the effect may be implemented by at least one actuator device until a new message with a new effect is received by the management module, and a new control signal is transmitted by the management module to the actuator device(s). Additionally or alternatively, the management module may transmit a further message to the at least one actuator device with a 'stop' or 'terminate' command, when the effect currently being implemented is to be terminated. Thus, the stop/terminate command may be transmitted in a separate message to the actuator device(s).

The message received by the management module may further comprise effect parameters specifying how the effect may be implemented by the or each actuator device. For example, if the effect is a lighting effect, the message may comprise effect parameters that specify brightness or luminance/luminance flux and/or hue, colour or wavelength, for instance. In another example, if the effect is a sound effect, the message may comprise effect parameters that specify a volume at which the sound is to be emitted. The message received by the management module may comprise one or more effect parameters for the effect, where each effect parameter is specified within the effects file itself. Additionally or alternatively, the effect parameters that are transmitted to actuator device in the control signal may be generated/devised by the management module which knows the capabilities of each actuator device, or by an authorisation module which receives user authorisations and/or preferences. Additionally or alternatively, the or each actuator device that implements the effect may generate/devise effects parameters itself.

For example, if the message received by the management module comprises an effect specifying that a sound should be emitted at a frequency of 20 Hz at a particular volume/amplitude, but the management module knows that a connected actuator device capable of emitting sounds can only produce sounds at frequencies greater than or equal to 30 Hz, then the management module may generate its own effect parameter for the effect that conforms with the actuator device's capabilities (e.g. "emit a 30 Hz sound"). In another example, if a user of a user device specifies that any sound effects implemented by an actuator device should be below 20,000 Hz, as part of the user authorisation process (described below), an authorisation module which receives user authorisations/preferences may use this information to generate effect parameters. These generated effect parameters may override other effect parameters (e.g. those embedded in/associated with the effects file, or generated by other modules). These generated effect parameters may be provided to the management module (via the user device) with an authorisation token created by the authorisation module. In another example, if an actuator device is instructed to implement an effect, the actuator device may itself determine the effect parameters. For example, if the effect is a "thunder and lightning effect" and the actuator device is a speaker, the actuator device may interpret this effect and determine that a low frequency sound should be emitted to mimic thunder.

The method implemented by the management module may further comprise: receiving, from each actuator device communicatively coupled to the management module, a registration request; requesting, responsive to the registration request, information about the capabilities of the actuator device; and storing, in a data store, information about the capabilities of the actuator device.

The method implemented by the management module may further comprise: linking, for each registered actuator device, the actuator device capabilities to one or more effect types; and storing, in the data store, the one or more effect types for each actuator device.

The method implemented by the management module may further comprise: identifying each actuator device in the vicinity of the user interface; retrieving, from the data store, the actuator device capabilities for each identified actuator device; providing, to a user interface, the retrieved actuator device capabilities for each identified actuator device; and requesting user authorisation to activate the capabilities of each identified actuator device.

The method implemented by the management module may further comprise: receiving an authorisation token comprising user authorisation of zero or more capabilities of each identified actuator device.

The step of transmitting a control signal may comprise: transmitting the control signal comprising instructions to implement the effect with the authorisation token to each identified actuator device in the vicinity of the user interface.

The step of transmitting a control signal may further comprise: linking, for each registered actuator device, the actuator device capabilities to one or more effect types; and storing, in the data store, the one or more effect types for each actuator device; wherein the step of transmitting a control signal comprises: identifying an effect type of the received effect; determining each identified actuator device linked to the determined effect type; and transmitting, responsive to the determining, the control signal comprising instructions to implement the effect with the authorisation token to each determined actuator device.

The step of transmitting a control signal may further comprise: reading the authorisation token to determine the user authorisation of zero or more capabilities of each identified actuator device; wherein the step of transmitting a control signal comprises: transmitting the control signal comprising instructions to implement the effect with the authorisation token to each identified actuator device in the vicinity of the user interface having an authorised capability.

The control signal may further comprise an authorisation token comprising user authorisation of zero or more capabilities of the actuator device.

The actuator device may: read the authorisation token; determine, using the authorisation token, if one or more capabilities of the actuator device are authorised; and implement the effect if one or more capabilities of the actuator device are authorised. If the actuator device determines that zero capabilities of the actuator device are authorised, the actuator device does not implement the effect.

The control signal may further comprise a time indicating when the effect is to be implemented, and wherein the step of implementing the effect is effected at this time.

The control signal may further comprise a duration indicating for how long the effect is to be implemented, and wherein the actuator device implements the effect for this duration.

The actuator device may: identify, from the control signal, an effect type of the received effect; and retrieve, from a database of effect types, instructions for implementing the received effect using one or more capabilities of the actuator device.

The system may further comprise: an authorisation module for: receiving, from the user device, user authorisation of zero or more capabilities of the at least one actuator device; creating an authorisation token comprising the user authorisation; and transmitting the authorisation token to the management module; wherein the control signal further transmitted by the management module further comprises the authorisation token.

BRIEF DESCRIPTION OF THE DRAWINGS

The techniques are diagrammatically illustrated, by way of example, in the accompanying drawings, in which.

DETAILED DESCRIPTION

Figure 1:
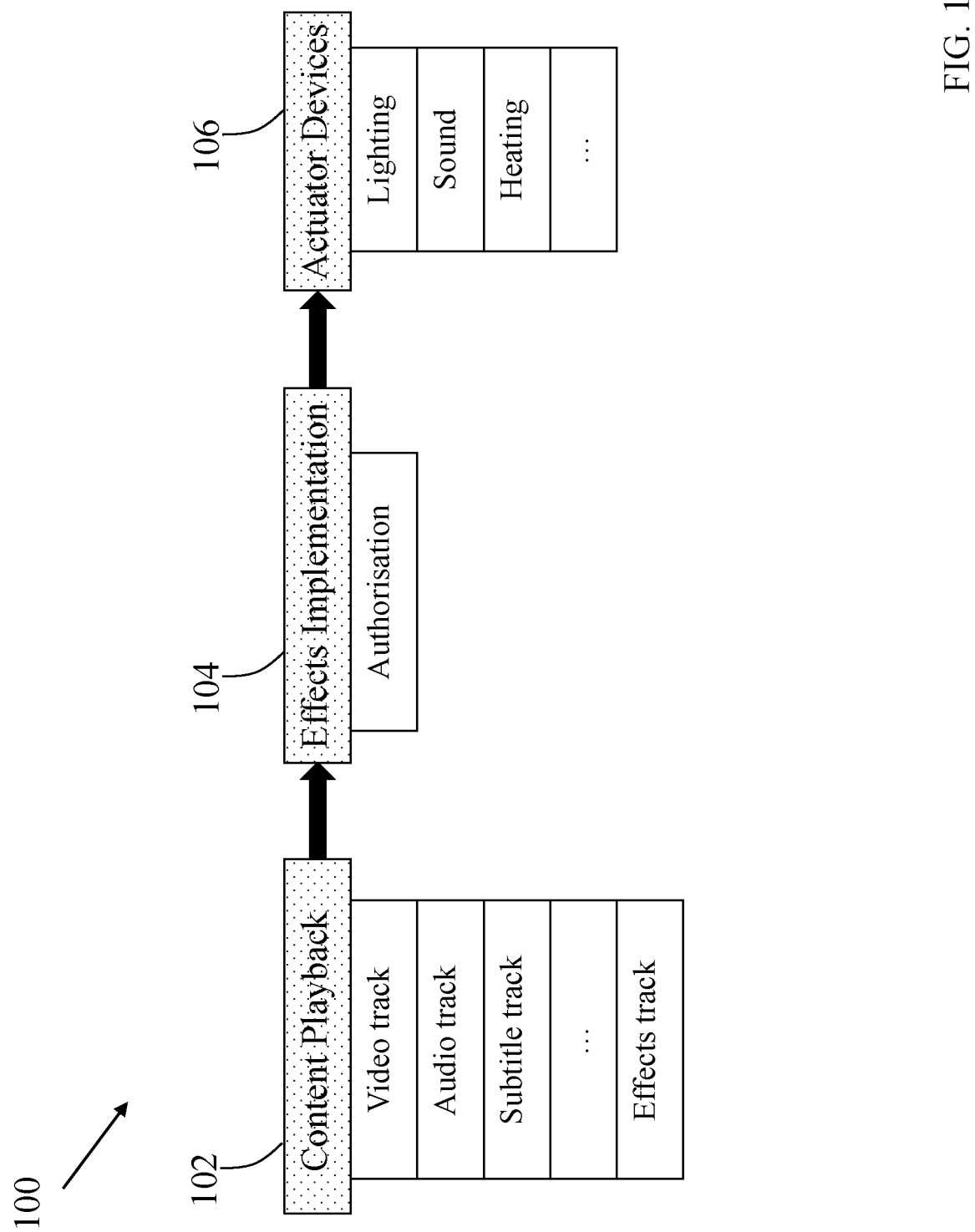
FIG. 1 shows a schematic of a system to implement physical effects associated with digital content.

Broadly speaking, embodiments of the present techniques provide methods, apparatus and systems for augmenting user experiences of digital content consumed on a user device. More particularly, embodiments of the present techniques provide methods for implementing physical effects specified in an effects file/track that is part of or associated with digital content via one or more Internet of Things (IoT) devices located in the environment in which the digital content is being consumed. Accordingly, effects that occur within digital content (e.g. a movie) may be simulated in a smart environment containing at least one IoT device, to provide an improved user experience of the digital content. The present techniques may be implemented in any smart environment, containing any type and number of IoT devices, such that the user experience is enhanced whether they consume digital content in their home, car, office or hotel room, for example.

Digital content, such as movies, e-books, audio-books, etc. may be provided with, or part of, or associated with, an effects file/effects track. A movie file, for example, usually comprises video data and audio data, and may comprise a subtitles file. Thus, a movie file may also comprise an effects file. As smart environments equipped with IoT devices become more commonplace, it may be possible to enhance the user experience of digital content by using IoT devices to implement effects that are present within the digital content. For example, if a scene in a movie is taking place on a stormy night, the movie file may contain, or be associated with, an effects file that specifies an effect to be implemented when that scene is played. An example effect may be a "thunder and lightning effect", which is to be implemented by one or more IoT devices in the environment in which the movie is being watched. For example, an IoT light may implement the effect by flashing on and off to mimic lightning, while an IoT speaker may implement the effect by emitting a low rumble to mimic thunder. Similarly, an e-book or audio-book may contain, or be associated with, an effects file that specifies effects to be implemented during particular sections of the book. For example, when the e-book or audio-book describes a scene taking place on a hot, sunny day, the effect may be a "heat effect", which is to be implemented by one or more IoT devices in the environment in which the book is being read/listened to. For example, an IoT heating device may implement the effect by increasing the temperature to mimic the hot day being described in the book. In this way, the user's experience of the digital content may be enhanced/augmented.

Some examples of the present techniques may be useful because specialised equipment or a proprietary system may not be required to implement the techniques. Rather, the present techniques harness the capabilities of IoT devices within a user's environment (home, office, car, hotel room, etc.) to augment a user's experience of digital content. Thus, examples of the present techniques may be implementable at a lower cost than, for example, 4D cinemas, such that an ordinary user/consumer of digital content can readily transform their environment and enhance their experience of digital content.

The present techniques may be IoT device agnostic, meaning that each effects file, and instructions sent to IoT devices to implement effects in an effects file, may be compatible with any type of IoT device made by any manufacturer. Each IoT device may be able to implement an effect according to its own capabilities/functionalities, by interpreting the effect and determining how to implement the effect itself. This may improve the ease with which the present techniques are implemented in an environment by a user, as no device-specific configuration or coding needs to be performed by a user.

The term "smart environment" used herein is used to mean any environment containing at least one IoT device.

The term "IoT device" is used interchangeably herein with the terms "actuator device", "actuator", "smart device", and "connected device".

The term "user device" used herein means any device via which a user may consume digital content, such as a smartphone, e-reader, television, tablet, desktop computer, laptop, portable electronic device, home entertainment system, in-vehicle entertainment system, for example. The user device is preferably able to communicate with IoT devices (to enable effects implementation) either directly, or via intermediary devices or services.

The techniques for augmenting user experiences of digital content are now described in more detail with reference to the accompanying drawings.

FIG. 1 shows a schematic of a system 100 to implement physical effects associated with digital content. Generally speaking, the system 100 comprises three elements: means 102 for playing/running/consuming digital content that comprises, or is associated with, an effects file; means 104 for controlling the implementation of effects in the effects file of, or associated with, digital content; and one or more actuator devices 106 for implementing the effects. The digital content may comprise video data or a video track, audio data or an audio track, a subtitles track, etc. depending on the type of digital content. For the purposes of the present techniques, the digital content comprises, or is associated with, an effects file or effects track. The means 102 for consuming digital content may be any suitable user device.

The means 104 for controlling effects implementation may be a module within the means 102, or may be implemented using a separate device(s) and/or service(s). The means 104 may perform one or more functions, such as authorisation. The authorisation function may comprise receiving user or administrator permissions to control specific actuator devices or to implement particular effect types. The authorisation function may comprise authorising (or not authorising) particular actuators to implement effects.

In embodiments, the means 104 for controlling effects implementation may collate information about the actuators 106 in each smart environment in which the user is located, may receive authorisations from a user or administrator, and may send instructions corresponding to the effects file of digital content to the actuators. (This will be described in more detail below). In this case, the means 104 does not process the effects file to, for example, determine effect type, determine how the effect should be implemented by the actuator(s), translate the effect into a specific command for the actuator(s), etc. Instead, each actuator device 106 may have the ability to interpret effects and determine how to implement the effects itself. This may be useful because each actuator device 106 knows what capabilities it has and can therefore readily determine how to implement effects based on its capabilities. For example, a 'lightning effect' could be implemented in different ways by an IoT strobe light and an IoT light bulb. This may also be useful because the means 104 does not need to know the precise technical specifications of each IoT device in each smart environment in order to determine how each IoT device is implement a particular effect.

In alternative embodiments, the means 104 for controlling effects implementation may perform functions such as distribution, interpretation, translation, etc. The interpretation function may comprise determining how the actuator(s) 106 may implement a particular effect. For example, if an effect in the effects file is called "thunder and lightning", the means 104 may interpret this effect for one or more actuators in a smart environment. Thus, the means 104 may interpret this effect as meaning a light actuator is to flash on and off, and a speaker actuator is to emit a low rumbling sound, etc. The translation function may comprise creating commands, based on the interpretation step, for each actuator to implement an effect. Thus, for example, the means 104 may create a command for a light actuator to cause the actuator to flash on and off for 30 seconds, and may create a command for a speaker actuator that causes the actuator to emit a low frequency sound that lasts 3 seconds and is repeated every 10 seconds. The distribution function may comprise sending control signals or commands to each actuator, based on the translation step. This may be useful if an actuator device is a constrained resource actuator device that does not have the necessary processing capabilities to be able to interpret effects itself.

Figure 2:
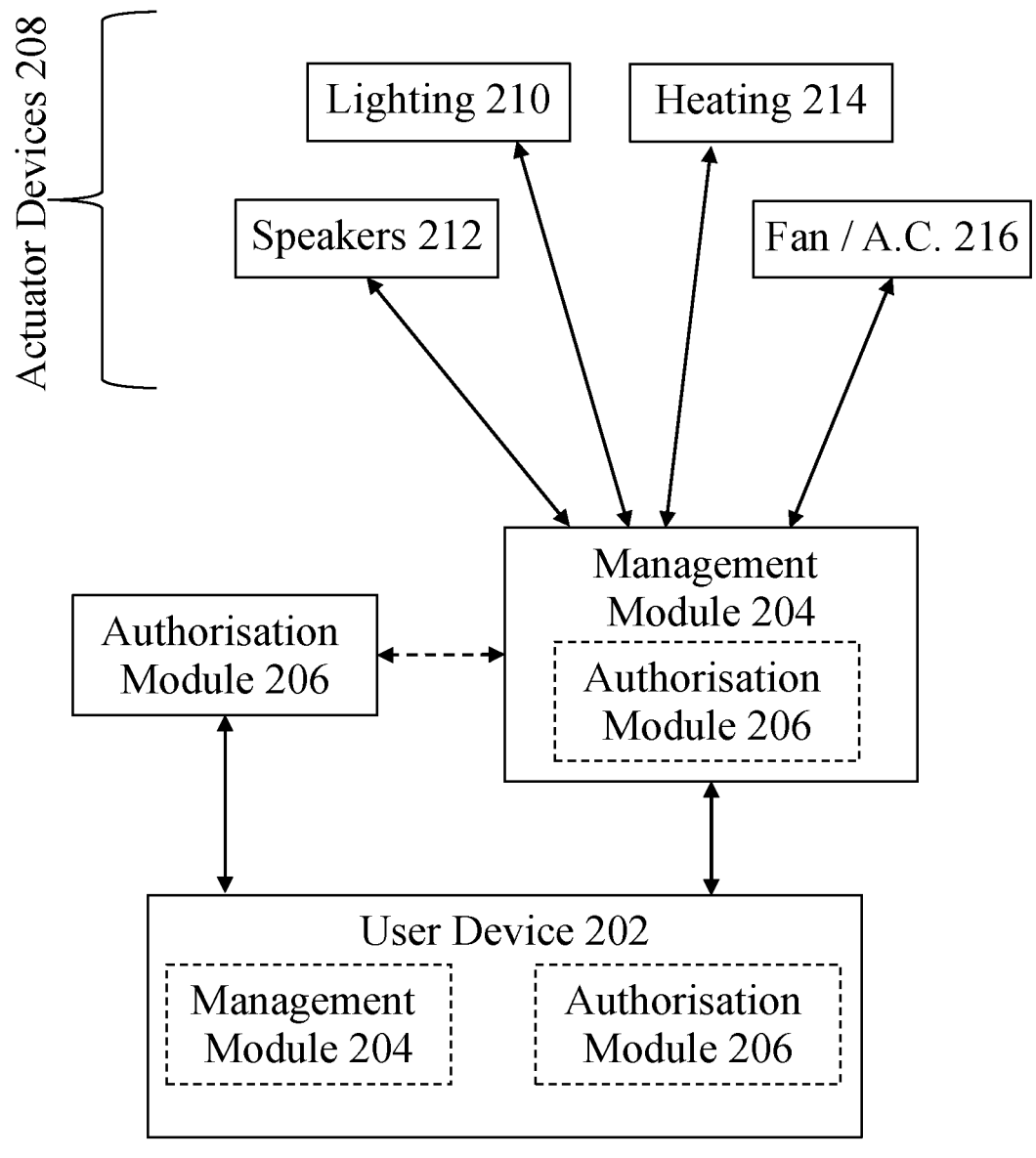
FIG. 2 is a block diagram of a system for implementing physical effects associated with digital content using one or more actuator devices.

FIG. 1 shows the general design of a system to augment user experiences of digital content. Turning to FIG. 2, this shows a block diagram of an example system 200 for implementing physical effects associated with digital content using one or more actuator devices. FIG. 2 generally illustrates how a system to augment user experiences of digital content may be implemented within a specific smart environment comprising a user device and one or more actuator devices (i.e. IoT devices). Within a smart environment, digital content comprising, or associated with, an effects file may be consumed on a user device 202. The user device 202 may be any suitable electronic device that can be used to play, display, or otherwise provide digital content to a user. For example, the user device 202 may be a smartphone, e-reader, television, tablet, desktop computer, laptop, portable electronic device, home entertainment system, in-vehicle entertainment system, etc. The user device 202 is preferably able to communicate with IoT devices (to enable effects implementation) either directly (via a wired or wireless connection), or indirectly via intermediary devices or services. For the sake of simplicity, a single user device 202 is shown in FIG. 2, but it will be understood that multiple user devices may exist within the system. For example, a user may own or use multiple user devices 202 via which the user consumes digital content.

In embodiments, the system 200 comprises a management module 204 and an authorisation module 206. The management module 204 and authorisation module 206 together perform the effects implementation functions described above with respect to FIG. 1. In embodiments, the management module 204 may comprise the authorisation module 206, as shown by the dashed box in FIG. 2. In embodiments, the management module 204 and authorisation module 206 may be part of the user device 202, as shown by the dashed boxes in FIG. 2. It will be understood that the functions of the management module 204 and authorisation module 206 remain substantially the same wherever the modules are located within the system 200.

The management module 204 performs a number of functions to implement effects in an effects file of digital content. The management module 204 may collate information on the actuators 208, and the capabilities of each actuator, located in a smart environment. The management module 204 may use this information to determine which actuator(s) 208 is suitable for implementing a particular effect in an effects file. The management module 204 may receive an effect from the user device 202 and send a control signal to the or each actuator 208 to implement the effect. Each effect may be implemented by one or more actuators. For example, a "rainstorm" effect may be implemented by speakers 212, which may be able to emit a low rumbling sound to implement the effect and mimic thunder, while lighting 210 may flash on and off to implement the effect and mimic lightning. A fan or air-conditioning unit 216 may be able to implement the effect by turning on (or increasing speed) to mimic winds in a rainstorm. A heating unit 214 may be able to implement the effect by turning on to mimic humidity, for example.

Management module 204 communicates with each actuator device 208 within system 200 and with the user device 202. The management module 204 may also communicate with authorisation module 206.

In embodiments, there is provided a machine-implemented method for augmenting user experiences of digital content consumed on a user device, the method comprising: receiving, at a management module, a message comprising an effect associated with an item of digital content; generating, based on the received message, a control signal comprising instructions to implement the effect; and transmitting, to at least one actuator device, the generated control signal comprising the instructions to implement the effect.

When an item of digital content is consumed on the user device 202, the management module 204 may receive a message comprising an effect associated with the digital content from the user device 202. The digital content may comprise an effects file containing one or more effects. Each effect may comprise a timestamp or time indicating when (or where) the effect occurs within the digital content. For example, the timestamp may specify that an effect is to occur four minutes and ten seconds into a movie or audiobook, or may occur on page 5 of an e-book. Each effect may comprise an indication of what type of effect or scene is to be produced. For example, the effect or scene type may be "thunderstorm", or "night", or "dawn", or "forest", for example. Each effect may comprise a duration indicating how long the effect is to be implemented for, or an end-time indicating when the effect is to be terminated. In embodiments, an effect may be implemented until a new control signal with a new effect is received. Thus, in embodiments, the message may comprise a time indicating when the effect is to be implemented, and/or a duration indicating for how long the effect is to be implemented, and/or an end-time indicating when an effect is to be terminated. Some or all of the contents of the message received by the management module 204 may be used to generate a control signal comprising instructions to implement an effect.

In embodiments, the message received by the management module 204 may comprise a single effect and related data (e.g. time information, effects parameters, etc.) from an effects file of an item of digital content. In this case, the management module 204 may generate a control signal comprising instructions to implement the received effect and transmit the control signal to actuator devices 208 after the message is received. In additional or alternative embodiments, the message received by the management module 204 may comprise all (or a plurality of) the effects and related data from an effects file of an item of digital content. In this case, the management module 204 may generate a first control signal comprising instructions to implement a first effect of the received effects and transmit this first control signal. The first effect may be the first effect in time, e.g. the first effect to occur in a movie or book. The management module 204 may then generate a second control signal comprising instruction to implement a second effect, and transmit this second control signal. The second control signal may be sent after the first effect has terminated (or is to be terminated), or just before the second effect is to be implemented. Thus, the management module 204 may receive all, or a plurality of, the effects to be implemented in a single message, but may transmit separate control signals to implement the effects. This may reduce the chance that the actuator devices 208 receive too much information at once, which the actuator devices 208 may have difficulty storing and/or processing (as IoT devices may be constrained resource devices with limited memory and/or processing power).

The message received by the management module 204 may comprise effect parameters specifying how the (or each) effect in the message may be implemented by the actuator device(s). For example, if an effect is a lighting effect, the message may comprise effect parameters that specify a brightness or luminance/luminance flux and/or a hue, colour or wavelength, for instance, to implement the effect correctly. For example, a "dawn" effect and a "twilight" effect may require different brightness levels and hue, and therefore may be associated with specific effect parameters. In another example, if an effect is a sound effect, the message may comprise effect parameters that specify a volume at which the sound is to be emitted. The message received by the management module 204 may comprise one or more effect parameters for the (or each) effect in the message, where each effect parameter is specified within the effects file itself. Additionally or alternatively, the effect parameters that are transmitted to the actuator device(s) 208 in the control signal may be generated/devised by the management module 204, which may know the capabilities of some or all of the actuator devices 208 in the user's environment, or by an authorisation module 206 which receives user authorisations and/or preferences. Additionally or alternatively, the or each actuator device 208 that implements the effect may generate/devise effects parameters itself.

For example, if a message received by the management module 204 comprises an effect specifying that a sound should be emitted at a frequency of 20 Hz at a particular volume/amplitude, but the management module 204 knows that a speaker 212 can only produce sounds at frequencies greater than or equal to 30 Hz, then the management module 204 may generate its own effect parameter for the effect that conforms with the actuator device's capabilities (e.g. "emit a 30 Hz sound"). In another example, if a user of a user device specifies that any sound effects implemented by speaker 212 should be below 20,000 Hz, as part of a user authorisation process (described below), an authorisation module 206 which receives user authorisations/preferences may use this information to generate effect parameters. These generated effect parameters may override other effect parameters (e.g. those embedded in/associated with the effects file, or generated by other modules). These generated effect parameters may be provided to the management module 204 (directly or via the user device 202) with an authorisation token created by the authorisation module 206. In another example, if an actuator device 208 is instructed to implement an effect, the actuator device 208 may itself determine the effect parameters. For example, if the effect is a "thunder and lightning effect" and the actuator device is a speaker 212, the actuator device may interpret this effect and determine that a low frequency sound should be emitted to mimic thunder.

Synchronisation between the actuator device(s) 208 implementing effects and the user device 202 on which digital content is consumed may be useful, to ensure that effects are implemented at the right point in the digital content (e.g. at the right time in a movie). In embodiments, the clocks of some or all of the actuator devices 208 may be synchronised with the clock of the user device 202 when digital content consumption begins. In embodiments, the management module 204 may send a synchronisation message to each actuator device 208, where the synchronisation message requires a reply from the actuator device 208, and may use this to determine how long it takes, on average, for a message to be received to/from each actuator device 208. Thus, if the management module 204 receives an effect to be implemented at 4 minutes 10 seconds into a movie, and the management module 204 knows that it takes 0.5 seconds for a message to travel to an actuator device 208, the management module 204 may send a control signal to the actuator device 208 at least 0.5 seconds before the effect is to be implemented. In embodiments, the management module 204 may send a control signal to the actuator device 208 as soon as the effect is received at the management module 204, with an instruction as to how many seconds to wait before implementing the effect. In this way, the actuator device 208 may implement the effect in sync with the digital content running on the user device 202. Similarly, the management module 204 may need to synchronise itself with the user device 202, if the management module 204 is not part of the user device 202. This may be achieved in a similar way, for example, by sending a synchronisation message to the user device 202 from the management module 204.

The management module 204 may collate a list of, or register, all actuator devices 208 in the vicinity of a user device 202. The management module 204 may collate a list of all actuator devices 208 that have ever been in the vicinity of a user device 202. For example, the management module 204 may register actuator devices 208 that are in a user's home, office, car, hotel room, etc. The management module 204 may determine which of the registered actuator devices 208 are in the vicinity of a user device 202, so that a control signal is only sent to nearby actuator devices 208. The management module 204 may be able to group actuator devices 208 together by the environment in which they are located, and store this information. For example, the management module 204 may determine that one environment contains an IoT light A, an IoT speaker B and an IoT heating device C—this may be defined as the user's "home" environment—and may determine that another environment contains an IoT light D and an IoT air conditioning unit E—this may be defined as the user's "office" environment. If the management module 204 determines that IoT light A is in the vicinity of the user device 202, the management module 204 may be able to determine, from the stored group information, that devices B and C are likely also in the vicinity of the user device 202, and that the control signals need to be transmitted to each of the three devices, but not to devices D and E. This may simplify the process used by the management module 204 to present a user with the device capabilities of the devices that in (or likely to be in) the vicinity of the user device 202, in order to obtain user preferences/authorisations (as explained below).

The management module 204 may: receive, from each actuator device 208 communicatively coupled to the management module 204, a registration request; request, responsive to the registration request, information about the capabilities of the actuator device 208; and store, in a data store, information about the capabilities of the actuator device 208. In embodiments, the management module 204 may link, for each registered actuator device, the actuator device capabilities to one or more effect types or scenes; and store, in the data store, the one or more effect types for each actuator device 208. This may enable the management module to send a control signal to implement a particular effect to only those actuator devices that have the capability to implement the effect. For example, if an effect is "night", the management module 204 may determine that only a lighting device 210 can implement the effect (e.g. by switching off or dimming), and so the control signal only needs to be sent to the lighting device 210.

The management module 204 may: identify each actuator device 208 in the vicinity of a user interface; retrieve, from the data store, the actuator device capabilities for each identified actuator device; provide, to the user interface, the retrieved actuator device capabilities for each identified actuator device; and request user authorisation to activate the capabilities of each identified actuator device. The user interface may be on the user device 202 or on another device used to perform aspects of the effect implementation. Generally speaking, the user interface may enable a user to determine which actuators 208 to authorise to implement effects. The user interface may be part of the management module 204 or authorisation module 206.

In embodiments, the management module 204 may receive an authorisation token comprising user authorisation of zero or more capabilities of each actuator device identified to be in the vicinity of the user interface 202. (Zero capability authorisations means that none of an actuator device's capabilities have been authorised by the user).

The system 200 may comprise an authorisation module 206. The authorisation module may: receive user authorisation of zero or more capabilities of the at least one actuator device; create an authorisation token comprising the user authorisation; and transmit the authorisation token to the management module 204. Accordingly, the control signal transmitted by the management module 204 may further comprise the authorisation token. The authorisation module 206 may create an authorisation token for each effects file or item of digital content. The authorisation module 206 may obtain user preferences or authorisations of particular capabilities of actuator devices (e.g. lighting, sound, heat, colour changes, etc.) from the user device 202 when a user begins consuming digital content on the user device. The user may input their authorisations via a user interface. The authorisation module 206 creates an authorisation token and transmits it to the user device 202. The user device 202 then transmits the authorisation token to the management module 204 with each effect to be implemented (or once, when digital content consumption begins).

The management module 204 may be a trusted device/module/service. In this case, the management module 204 may be able to/permitted to, read the authorisation token received from the user device 202. In this case, the management module 204 may read the authorisation token to determine which of the actuator devices 208 in the vicinity of the user device 202 have been authorised (or have had their capabilities authorised) by the user. The management module 204 may then send a control signal to implement an effect to only those actuator devices 208 that have been authorised (or have had their capabilities authorised). This may reduce the amount of information that needs to be transmitted to implement effects, as control signals are only sent to those actuator devices 208 that have the necessary authorisations. This may be useful if the actuator devices do not have the ability to process the authorisation token.

The management module 204 may not be a trusted device/module/service—for example, the management module may be an online/remote service or remote device that is not owned by a user or in the user's premises. In this case, the management module 204 may not be able to, or permitted to, read the authorisation token received from the user device 202. The management module 204 may simply send the authorisation token to at least some of the actuator devices 208 in the vicinity of the user device 202, with the control signal to implement an effect. This may be useful if the actuator device 208 and the management module 204 are not in the same network (e.g. WiFi network). This may avoid placing trust in the management module 204, but may require the actuator devices to process the authorisation token and determine themselves whether or not they have been authorised to implement an effect.

Where the management module 204 is a cloud-based or remote service or device, the management module 204 may need to be externally configured by a user of user device 202. For example, if the management module 204 is a web-based service or application (such as IFTTT or similar), the user may configure the service (and define/program some logic or processes to be performed by the service) so that the service is able to receive trigger events and transmit reaction events. The user may also define specific actuator devices with which the management module 204 may be able to communicate (and e.g. send reaction events to). Events in this case may be communicated to the web-based service using messages in an agreed format, and may be, for example internet messages such as email, HTTP-based messages, etc. When the web-based management module 204 receives a trigger event (such as a message from the user device 202 indicating that digital content is being initiated), the management module 204 may process the user-defined logic and may respond by transmitting reaction event messages towards one or more user-defined recipients, such as an actuator device 208. The remote management module 204 is able to control remote actuator devices 208 using the configuration and logic that the user has provided. In embodiments therefore, the user may configure a management module 204 by providing it with specific actions to perform in response to receiving particular messages/instructions, and specific messages/control signals to transmit to actuator devices 208. The management module 204 may not, therefore, be able to control an individual actuator device 208 for the purpose of implementing an effects file unless the user has explicitly configured the management module to do so. This ensures that an untrusted remote management module 204 is only able to control actuator devices 208 in a user's environment if the user has explicitly configured the management module 204 to do so (and given the management module 204 the relevant permissions or access to do so).

Thus, in embodiments, each actuator device 208 that receives a control signal from the management module 204 may: read the authorisation token; determine, using the authorisation token, if one or more capabilities of the actuator device are authorised; and implement the effect if one or more capabilities of the actuator device are authorised.

The management module 204 may transmit a control signal by: transmitting the control signal comprising instructions to implement the effect with the authorisation token to each identified actuator device in the vicinity of the user interface.

The management module 204 may: link, for each registered actuator device, the actuator device capabilities to one or more effect types; and store, in the data store, the one or more effect types for each actuator device 208. The management module may transmit a control signal by: identifying an effect type of the received effect; determining each identified actuator device linked to the determined effect type; and transmitting, responsive to the determining, the control signal comprising instructions to implement the effect with the authorisation token to each determined actuator device.

The management module 204 may: read the authorisation token to determine the user authorisation of zero or more capabilities of each identified actuator device; wherein the step of transmitting a control signal comprises: transmitting the control signal comprising instructions to implement the effect with the authorisation token to each identified actuator device in the vicinity of the user interface having an authorised capability.

In embodiments, the authorisation token may comprise an expiration date or time. An authorisation token may be created per item of content, and is set to expire when the user has finished consuming the item of content (e.g. finished watching a movie or reading an e-book). An authorisation token may be created per environment (e.g. for a user's home, vehicle or temporary accommodation/hotel room), and may be set to expire after a certain duration. This may simplify the user experience, as they may be able to consume multiple items of content without having to specify their preferences multiple times. When an actuator device 208 receives an authorisation token, the actuator device 208 may determine if the authorisation token has expired. If the authorisation token has expired, the actuator device 208 may send a message to the management module 204 requesting a new token or for the user to re-authorise particular actuator devices 208 or actuator device capabilities. In embodiments, the management module 204 may check if the authorisation token has expired before it transmits control signals to the actuator device(s) 208 used to implement the effects.

In embodiments, an access control list (ACL) or similar may be established for each actuator device 208, or for a plurality of actuator devices 208 of the same type. The ACL is a list of permissions that species the access rights allowed and/or denied to an entity (e.g. a user, set of users, system processes, etc). The ACL may specify what operations each entity (e.g. a user) is able to perform with respect to the actuator device 208. The ACL may specify multiple entities and the access rights for each entity—each entity may have an associated permission level or priority level. For example, an owner of an actuator device 208 may have a higher permission level than a user/temporary user of the actuator device 208. For example, an actuator device may be a lighting device in a house, and the ACL may be established for each occupant of the house, or the homeowner(s). The ACL may specify that the homeowner can use the lighting device to implement effects at any time. In another example, an actuator device may be a lighting device in a hotel room, and the ACL may be established for each guest in the hotel room, which may specify that the guest can use the lighting device to implement effects only during the time they are staying in the room. Similarly, ACLs may be used to prevent a hotel guest from using lighting devices in, e.g. hotel corridors, communal areas, the hotel lobby, etc. from implementing effects, while permitting the hotel manager to control any of the lighting devices in a hotel. The hotel manager may be able to override a guest's use of a lighting device to implement effects, e.g. if the lighting effects are disturbing to other guests in the hotel.

Figure 3:
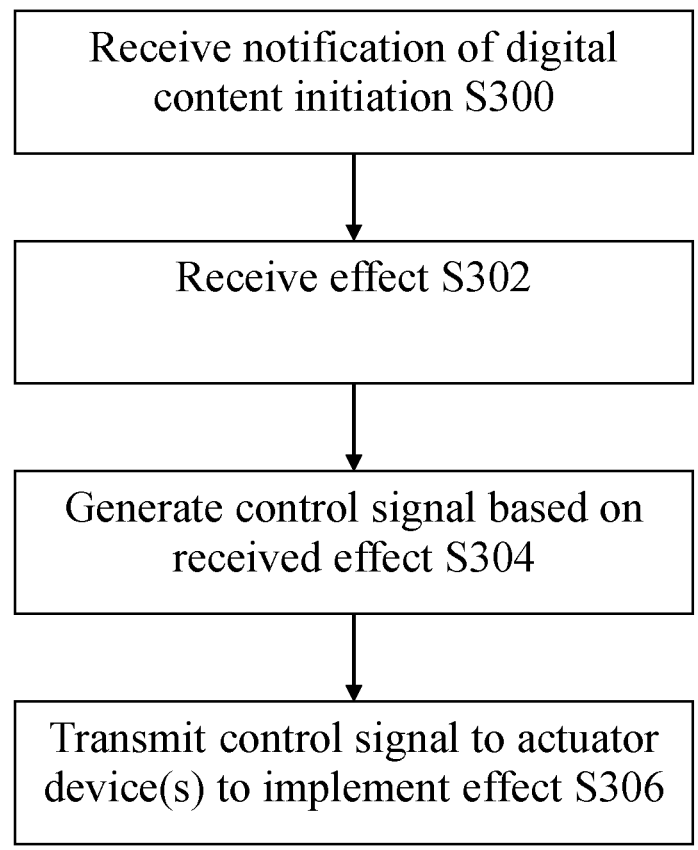
FIG. 3 is a flow diagram of example steps performed by a management module to implement physical effects.

FIG. 3 is a flow diagram of example steps performed by a management module to implement physical effects and augment user experiences of digital content consumed on a user device. The management module may receive notification of digital content initiation (step S300). This may enable the management module to determine which actuator devices are in the vicinity of the user device and could receive control signals containing instructions to implement effects. The management module may receive a message comprising an effect associated with an item of digital content that is being played/consumed on a user device (step S302). As mentioned above, the effect may comprise an effect or scene type, one or more effect parameters, a start time, an end time and/or a duration. The management module generates, based on the received message, a control signal comprising instructions to implement the effect (step S304). For example, if the received message specifies a specific start time and an end time of the effect, the control signal may be generated to include start and end times. Similarly, if the received message comprises an effect parameter, the generated control signal may include this effect parameter. The management module may transmit, to at least one actuator device, the generated control signal comprising instructions to implement the received effect (step S306).

Figure 4:
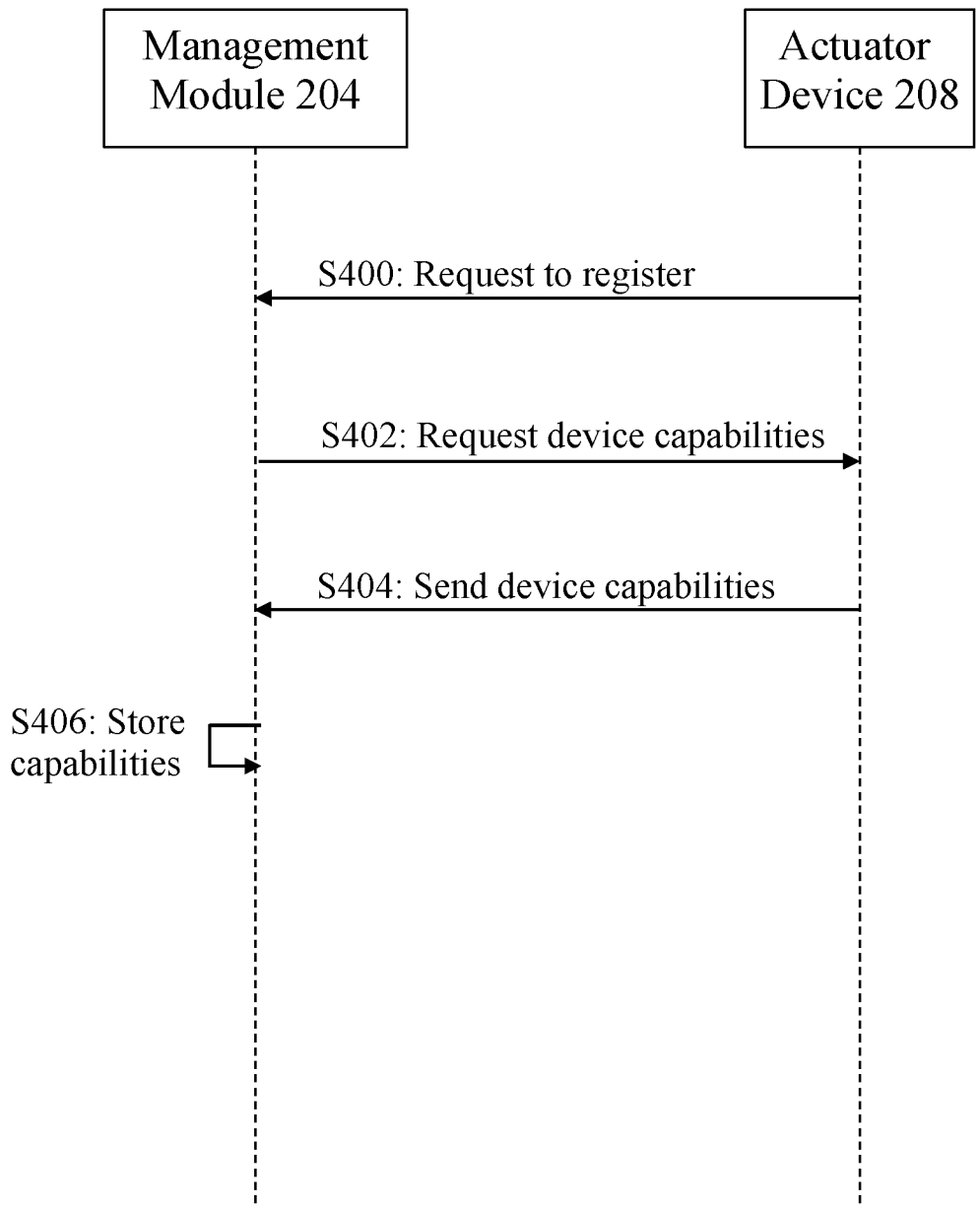
FIG. 4 is a schematic diagram of steps to register an actuator device with a management module.

FIG. 4 is a schematic diagram of steps to register an actuator device 208 with a management module 204. The management module 204 may receive a registration request from an actuator device 208 that is located in proximity to, or in the local environment of, a user/user device (step S400). The registration request may be a request to join the system to implement effects in digital content, or may be a more general request to be controlled by/communicate with the user device. The registration request may comprise data identifying the actuator device 208 and/or its location in a particular network/IoT network. This data may help the management module 204 determine if the request is received from a device 208 that is in the same network as the user device (and to potentially identify any rogue/spoof requests that could be malicious). This data may help the management module 204 to store information about the device 208 (when registered) in a database/storage comprising information about actuator devices and actuator device capabilities.

The management module 204 may transmit a request for the actuator device's capabilities in response (step S402). This response message may be separate to an acknowledgement message that is typically sent in IoT communications, or part of an acknowledgement message. The actuator device 208 may reply by sending a message comprising device capabilities (step S404). The actuator device 208 may know its own capabilities—for example, this information may be stored in a memory/data storage of the actuator device 208, such that the actuator device 208 may retrieve the information and transmit it to the management module 204. In embodiments, the actuator device 208 may not know its own capabilities. In this case, the actuator device 208 may provide the management module 204 with other information that can enable the management module 204 to determine the capabilities of the actuator device 208. For example, the actuator device 208 may provide a device ID, name or serial number to the management module 204. The management module 204 may use this information to determine the capabilities of the actuator device 208, for example, by consulting a larger database or cloud service storing information about IoT devices.

If the management module 204 is able to retrieve the required capability information about the actuator device 208, or is otherwise satisfied that the registration request originates from a genuine actuator device 208, the management module 204 registers the actuator device 208 and stores at least the capabilities information about the device (step S406). The actuator device may store information about where the actuator device 208 is located (e.g. which environment the device is in), and may link the actuator device 208 to (or group with) any other devices in the same environment, as mentioned above. The management module 204 may send a confirmation message to the actuator device.

Figure 5:
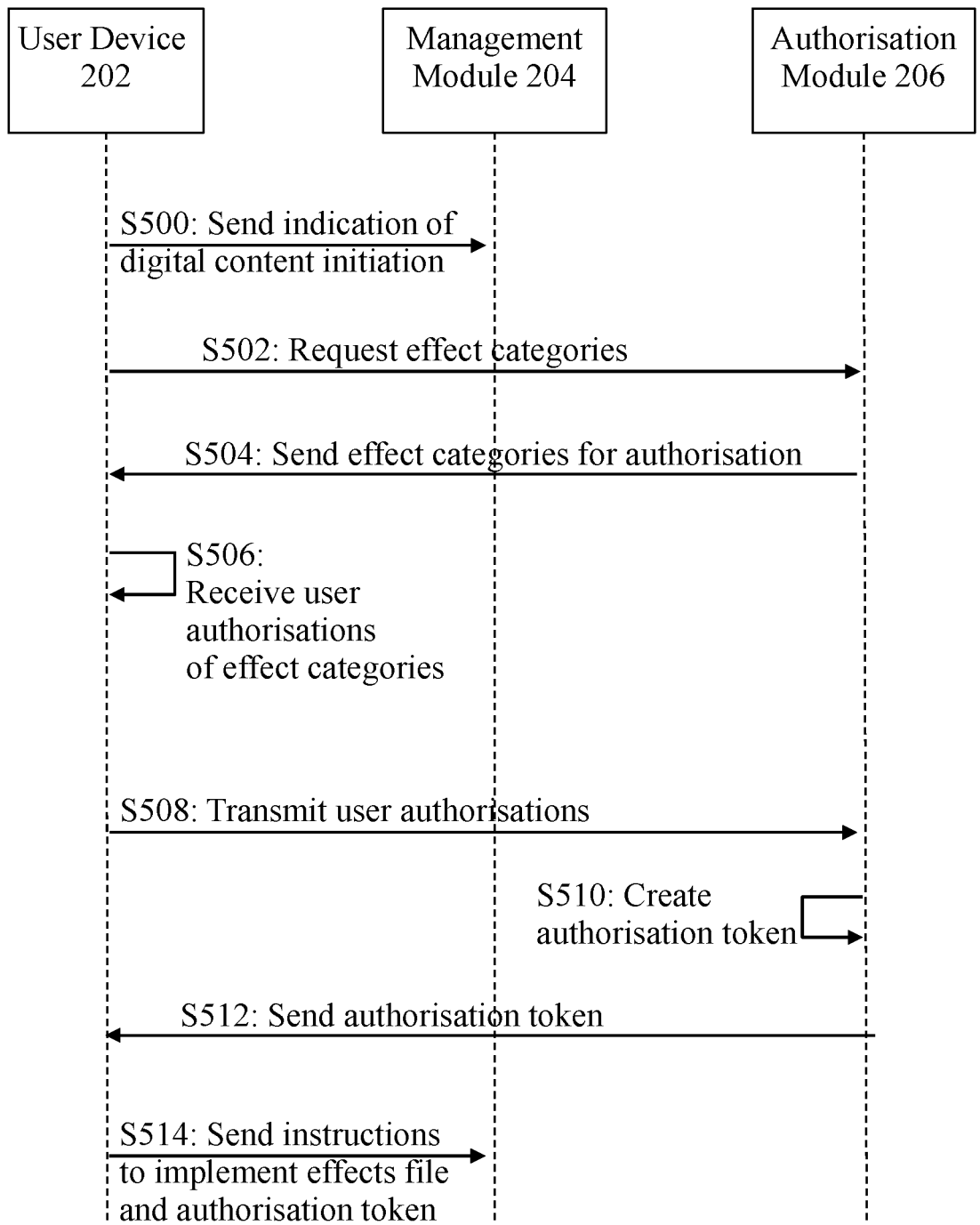
FIG. 5 is a schematic diagram of steps to authorise specific effect types and/or actuator devices.

FIG. 5 is a schematic diagram of steps to authorise specific effect categories and/or actuator devices. A user device 202 that is being used to consume an item of digital content may send an indication to a management module 204 that the item of digital content is being initiated/is about to be launched/consumed (step S500). This provides the management module 204 with advance notice that effects may need to be implemented, and that a message containing effects may be transmitted to the management module 204 soon afterwards. The management module 204 may then take any necessary steps to ensure it is ready to implement effects. For example, the management module 204 may start polling actuator devices to determine which actuator devices are available for effects implementation, or may send synchronisation messages to perform clock synchronisation as described above.

The user device 202 may send a message to authorisation module 206 requesting effect categories, actuator device capabilities and/or actuator devices for authorisation (step S502). An "effect category" is a generic grouping of related effects. For example, one effect category may be "lighting"—this group may encompass different lighting effects such as dimming, turning on/off, flashing, strobing, colour changes, etc. The effects in the effect category may be implementable by a single actuator device or multiple actuator devices. By authorising (or not authorising) a particular effect category, the user may efficiently specify which actuator devices (or capabilities) are to be activated (or disabled). In embodiments, the user may simply authorise (or not authorise) particular actuator device capabilities or whole actuator devices. For example, if the user does not wish for any lighting effects to be implemented, the user may not authorise any lighting actuator devices. In response to request, the authorisation module 206 sends the user device 202 a list of effect categories, actuator device capabilities or actuator devices for the user to authorise (step S504). In embodiments, the authorisation module 206 requests this information from the management module 204, in order to provide the information to the user device 202, because the management module 204 may have up-to-date information about actuator devices and actuator device capabilities. Furthermore, the management module 206 may know which actuator devices 208 are in proximity of the user device 202 and therefore, may know which specific devices/capabilities exist and need authorising. Thus, by communicating with the management module 204, the authorisation module 206 may be able to obtain more relevant information about device capabilities or devices for authorisation.

When the user device 202 has received the requested information from the authorisation module 206, the user device 202 may display the information on a user interface, to enable the user to enter their preferences/authorisations. At step S506, the user device receives the user authorisations of effect categories, actuator devices and/or actuator capabilities via the user interface. The user device 202 transmits the user authorisations to the authorisation module (step S508). The authorisation module 206 creates an authorisation token using the received user authorisations (step S510). The authorisation token is used by the management module 204 or actuator devices to determine whether or not an actuator device (or a capability of the actuator device) has been authorised, and thereby, determine whether or not to implement an effect.

The authorisation process, including the authorisation token creation process and the interpretation/reading of the token by the management module 204 or actuator devices, may use or be based upon existing authorisation techniques. For example, the OAuth open standard for access delegation may be used to provide authorisation or access tokens to a user device so that the user device may access particular resources or capabilities of the actuator devices (which may not, in some cases, be owned by the user of the user device 202 and may therefore, be third party devices). As shown in FIG. 5, the authorisation token created by the authorisation module 206 is transmitted to the user device 202 (step S512), and the user device 202 sends a message to the management module 204 comprising instructions to implement an effect together with the authorisation token (step S514). The authorisation token is used to determine which actuator devices or actuator device capabilities could be accessed (and optionally, which should not be accessed) to implement effects.

Figure 6:
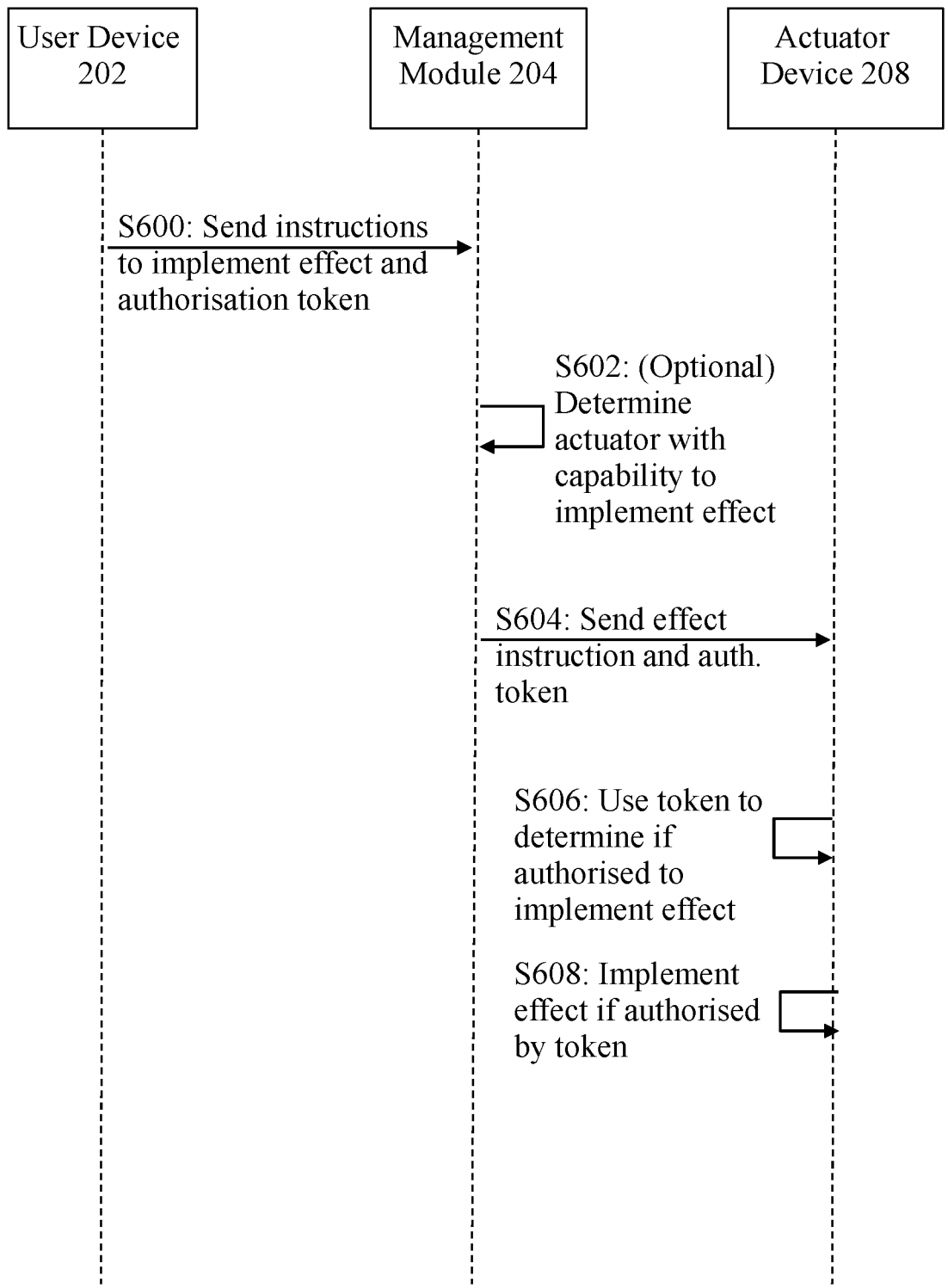
FIG. 6 is a schematic diagram of steps to implement effects where the management module is not trusted.

FIG. 6 is a schematic diagram of steps to implement effects where the management module is not trusted. For example, as mentioned above, the management module 204 may be an online or remote service, or remote device, that is not owned by a user or is not located in close proximity to the user device. For example, the management module 204 may not be in the same network (e.g. in the same WiFi network) as the user device 202. In this case, the management module 204 may not be able to/permitted to read the authorisation token that is sent by the user device 202 with the message comprising at least one effect to be implemented. Accordingly, at step S600, the user device 202 transmits a message to the management module 204 comprising an effect and instructions to implement the effect. The message may also comprise an authorisation token. Altneratively, the authorisation token is sent with the message.

In this example, the management module 204 is not trusted and therefore, the management module 204 may simply send the authorisation token to at least some of the actuator devices 208 in the vicinity of the user device 202, with a control signal to implement an effect (step S604). Optionally, the management module 204 may determine which actuator device has/actuator devices have the capability to implement the effect (step S602), and may send the control signal and authorisation token to the determined actuator device(s) at step S604.

The or each actuator device 208 that receives the control signal and authorisation token from the management module 204 determines if it has the capabilities to implement the effect and if it is authorised to do so. Thus, at step S606, the actuator device 208 may use the authorisation token to determine if the actuator device or any of its capabilities have been authorised to implement effects. If the actuator device 208 has been authorised, and if the actuator device has the capability to implement the effect (e.g. comprises a light that can be used to implement a lighting effect), then the actuator device 208 implements the effect according to the control signal/instructions at step S608. If the management module 204 only sent the control signal to actuator devices with the appropriate capabilities for the effect to be implemented, the actuator device 208 may not need to determine if it has the capability to implement the effect. In some cases, the control signal may be sent to all actuator devices 208 in the proximity of the user device 202, and neither the management module 204 nor the actuator device 208 determines if the actuator device has the capabilities to implement the effect. In these cases, if the actuator device 208 determines it has been authorised (using the authorisation token), the actuator device 208 may proceed to implement the instructions in the control signal. If the actuator device 208 does not possess the capability needed to perform the effect, a processor of the actuator device may simply ignore the instructions.

Figure 7:
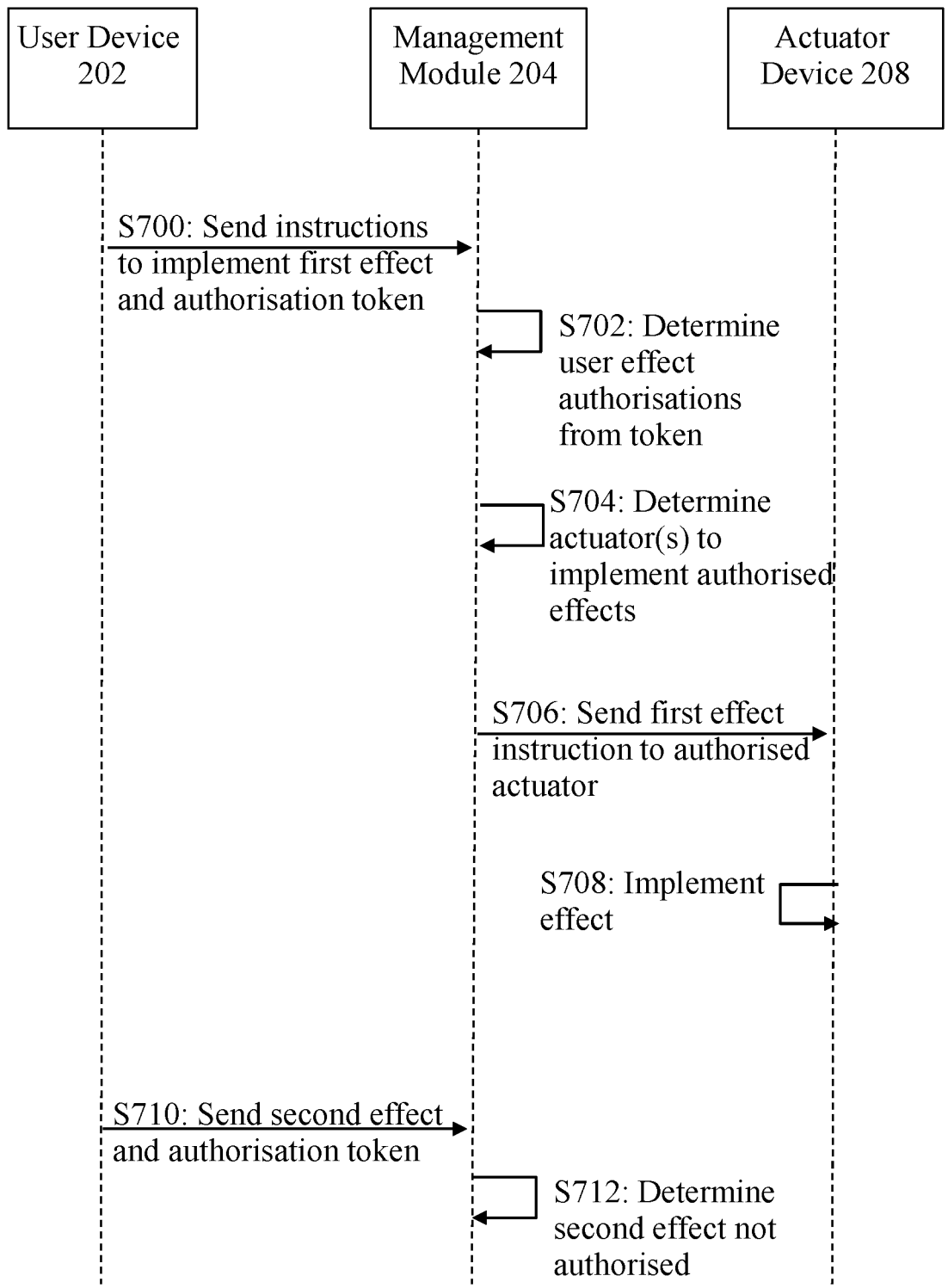
FIG. 7 is a schematic diagram of steps to implement effects where the management module is trusted.

FIG. 7 is a schematic diagram of steps to implement effects where the management module is a trusted device, module or service. For example, the management module 204 may be part of the user device 202, or may be located within the same network as the user device 202 (e.g. same WiFi network). In this case, the management module 204 may be permitted to read the authorisation token received from the user device 202. The management module 204 may read the authorisation token to determine which of the actuator devices 208 in the vicinity of the user device 202 have been authorised (or have had their capabilities authorised) by the user. The management module 204 may then send a control signal to implement an effect to only those actuator devices 208 that have been authorised (or have had their capabilities authorised). This may reduce the amount of information that needs to be transmitted to implement effects, as control signals are only sent to those actuator devices 208 that have the necessary authorisations. This may be useful if the actuator devices do not have the ability to process the authorisation token.

Accordingly, at step S700, the user device 202 transmits a message to the management module 204 comprising a first effect and instructions to implement the first effect. The message may also comprise an authorisation token. Altneratively, the authorisation token is sent with the message.

In this example, the management module 204 is trusted and therefore, the management module 204 may analyse the authorisation token before transmitting a control signal to any actuator devices 208 in the vicinity of the user device 202. At step S702, the management module 204 reads the received authorisation token to determine which effect categories, device capabilities and/or actuator devices the user has authorised. The management module 204 may also determine the effect type of the first effect, in order to determine which actuator devices 208 the control signal should be sent to, and which of these have been authorised (step S704). The management module 204 then generates a first control signal for the first effect and sends the control signal to those actuator devices 208 which are able to implement the effect and have been authorised to do so (according to the authorisation token) (step S706). The or each actuator device 208 which receives the control signal may then implement the effect according to the instructions in the control signal (step S708).

At a later time, the user device 202 sends a further message to the management module 204 comprising a second effect and instructions to implement the second effect (step S710). The message may also comprise the authorisation token. Altneratively, the authorisation token may be sent with the message. Alternatively, the user device 202 may indicate that the previously transmitted authorisation token is still applicable. In embodiments, the authorisation token may only be transmitted once per item of digital content being consumed on the user device 202, and the management module 204 may continue using the authorisation token until the token expires, or until a new token with new authorisations is received.

In this case, the management module 204 analyses the authorisation token and second effect and determines that the second effect is not authorised. For example, the authorisation token may specify that lighting effects are not authorised, and the second effect may be a "lightning effect". Thus, the management module 204 determines that the second effect is not to be implemented and takes no action.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. An actuator device for augmenting a user experience of digital content consumed on a user device, the actuator device comprising:
   a memory;
   a processor coupled to the memory, to:
      receive a control signal comprising one or more instructions to implement an effect associated with an item of digital content and an authorisation token created for the actuator device comprising user authorisation of zero or more capabilities of the actuator device and user preferences for the zero or more capabilities of the actuator device;
      read the authorisation token;
      determine, using the authorisation token, if one or more capabilities of the actuator device are authorized;
      determine how to implement the effect at the actuator device using one or more capabilities of the actuator device and the user preferences for the zero or more capabilities of the actuator device; and
      implement the effect in accordance with the user preferences when one or more capabilities of the actuator device are authorised.

2. The actuator device as claimed in claim 1, wherein if the processor determines that zero capabilities of the actuator device are authorised, the processor does not implement the effect.

3. The actuator device as claimed in claim 1, wherein the control signal further comprises a time indicating when the effect is to be implemented, and wherein the step of implementing the effect is effected at this time.

4. The actuator device as claimed in claim 1, wherein the control signal further comprises a duration indicating for how long the effect is to be implemented, and wherein the actuator device implements the effect for this duration.

5. The actuator device as claimed in claim 1 wherein the processor:
   identifies, from the control signal, an effect type of the received effect; and
   retrieves, from a database of effect types, instructions for implementing the received effect using one or more capabilities of the actuator device.

6. A system for augmenting user experiences of digital content consumed on a user device, the system comprising:
   a user device for consuming an item of digital content, the digital content comprising an effects file;
   at least one actuator device;
   a management module to:
      receive a message identifying an effect associated with an item of digital content;
      identify at least one actuator device in an environment;
      receive at least one authorisation token comprising authorisation of zero or more capabilities of at least one actuator device and user preferences for the zero or more capabilities of the actuator device;

generate, based on the received message, a control signal comprising one or more instructions to implement the effect at the actuator device and the authorisation token; and transmit, to the at least one actuator device, the generated control signal comprising the one or more instructions to implement the effect and the authorisation token;

wherein the at least one actuator device:

receives the generated control signal comprising the one or more instructions to implement the effect and the authorisation token;

reads the authorization token;

determines, using the authorisation token, if one or more capabilities of the actuator device are authorized;

determines how to implement the effect using one or more capabilities of the actuator device and the user preferences for the zero or more capabilities of the actuator device; and implements the effect in accordance with the user preferences when one or more capabilities of the actuator device are authorised.

7. The system as claimed in claim 6 further comprising:
an authorisation module for:

receiving, from the user device, user authorisation of zero or more capabilities of the at least one actuator device and user preferences for the zero or more capabilities of the actuator device;

creating an authorisation token comprising the user authorisation and the user preferences; and transmitting the authorisation token to the management module.

8. A management module comprising:
communication circuitry to communicate with one or more actuator devices remote therefrom;
a memory;
a processor coupled to the memory, the processor to:

receive a message identifying an effect associated with an item of digital content;

identify at least one actuator device of the one or more actuator devices;

receive at least one authorisation token comprising authorisation of zero or more capabilities of the at least one actuator device and user preferences for the zero or more capabilities of the at least one actuator device;

generate, based on the received message, a control signal comprising one or more instructions to implement the effect at the actuator device; and transmit, to the at least one actuator device, the generated control signal comprising the one or more instructions to implement the effect and the authorisation token.

9. The management module as claimed in claim 8, wherein the processor further:

requests user authorisation of the zero or more capabilities of the identified at least one actuator device.

10. The management module as claimed in claim 8, wherein the received message comprises at least one of the following: a time indicating when the effect is to be implemented, a duration indicating for how long the effect is to be implemented, and an end time indicating when the effect is to be terminated.

11. The management module as claimed in claim 8, wherein the generated control signal comprises effect parameters specifying how the effect is to be implemented by the at least one actuator device.

12. The management module as claimed in claim 8, wherein the processor further:

receives, from each actuator device communicatively coupled to the management module, a registration request;

requests, responsive to the registration request, information about the capabilities of the actuator device; and stores, in a data store, information about the capabilities of the actuator device.

13. The management module as claimed in claim 12, wherein the processor further:

links, for each registered actuator device, the actuator device capabilities to one or more effect types; and stores, in the data store, the one or more effect types for each actuator device.

14. The management module as claimed in claim 12, wherein identifying at least one actuator device in an environment comprises identifying each actuator device in the vicinity of a user interface; and the processor further:

retrieves, from the data store, the actuator device capabilities for each identified actuator device;

provides, to the user interface, the retrieved actuator device capabilities for each identified actuator device; and requests user authorisation to activate the capabilities of each identified actuator device.

15. The management module as claimed in claim 14, wherein the processor further:

links, for each registered actuator device, the actuator device capabilities to one or more effect types; and stores, in the data store, the one or more effect types for each actuator device;

wherein transmitting the generated control signal comprises:

identifying an effect type of the received effect;

determining each identified actuator device linked to the determined effect type; and transmitting, responsive to the determining, the generated control signal to each identified actuator device linked to the determined effect type.

* * * * *